US012718660B2

(12) United States Patent
Knight et al.

(10) Patent No.: US 12,718,660 B2
(45) Date of Patent: Aug. 25, 2026

(54) GAMING SYSTEM AND METHOD WITH A PERSISTENT ELEMENT FEATURE

(71) Applicant: LNW Gaming, Inc., Las Vegas, NV (US)

(72) Inventors: Jamie Knight, Henderson, NV (US); Mithun Nath, Henderson, NV (US); Mariela Polena, Las Vegas, NV (US); Kimberly Cohn, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 297 days.

(21) Appl. No.: 18/070,715

(22) Filed: Nov. 29, 2022

(65) Prior Publication Data

US 2024/0177564 A1 May 30, 2024

(51) Int. Cl.
*G07F 17/32* (2006.01)

(52) U.S. Cl.
CPC ...... *G07F 17/3244* (2013.01); *G07F 17/3213* (2013.01); *G07F 17/3267* (2013.01)

(58) Field of Classification Search
CPC ... G07F 17/3267; G07F 17/3211; G07F 17/34
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
5,431,408 A 7/1995 Adams
5,511,781 A 4/1996 Wood et al.
5,618,232 A 4/1997 Martin
(Continued)

FOREIGN PATENT DOCUMENTS

AU 2013251288 A1 5/2014
AU 2014202042 A1 5/2014
(Continued)

*Primary Examiner* — Jeffrey K Wong

(57) ABSTRACT

There are provided a gaming machine and method that utilize game-logic circuitry and a presentation assembly configured to present a plurality of symbol-bearing base reels, a base array, and a plurality of persistent elements. The plurality of base reels are spun and stopped to land symbols from the base reels in the base array. In response to the landed symbols including at least one accumulation symbol, an animation of addition of the accumulation symbol to one of the plurality of persistent elements is presented. An animation of the accumulation symbol being added to one or more of the plurality of persistent elements in a cascading fashion may also be presented. A random determination whether or not to trigger one or more game features is made. If the determination is to trigger the one or more game features, the one or more game features are implemented via the game-logic circuitry and the presentation assembly.

20 Claims, 13 Drawing Sheets

(56) References Cited

U.S. PATENT DOCUMENTS 5,695,188 A 12/1997 Ishibashi
5,704,835 A 1/1998 Dietz
5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes, Jr. et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,004,207 A 12/1999 Wilson, Jr. et al.
6,027,115 A 2/2000 Griswold et al.
6,033,307 A 3/2000 Vancura
6,048,269 A 4/2000 Burns et al.
6,050,895 A 4/2000 Luciano, Jr. et al.
6,056,642 A 5/2000 Bennett
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 2/2001 Mayeroff
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,346,043 B1 2/2002 Colin et al.
6,364,766 B1 4/2002 Anderson et al.
6,375,567 B1 4/2002 Acres
6,375,570 B1 4/2002 Poole
6,413,162 B1 7/2002 Baerlocher et al.
6,481,713 B2 11/2002 Perrie et al.
6,517,432 B1 2/2003 Jaffe
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,561,904 B2 5/2003 Locke et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Laughlin
6,692,356 B2 2/2004 Baerlocher et al.
6,702,675 B2 3/2004 Poole et al.
6,731,313 B1 5/2004 Kaminkow
6,749,502 B2 6/2004 Baerlocher
6,786,818 B1 9/2004 Rothschild et al.
6,832,957 B2 12/2004 Falconer
6,837,790 B1 1/2005 Kaminkow
6,855,053 B2 2/2005 Baerlocher
6,869,360 B2 3/2005 Marks et al.
6,878,061 B2 4/2005 Baerlocher et al.
6,896,617 B2 5/2005 Daly
6,910,962 B2 6/2005 Marks et al.
6,916,243 B2 7/2005 Yoshida
6,918,834 B2 7/2005 Vancura
6,921,334 B1 7/2005 Bennett
6,926,609 B2 8/2005 Martin
6,960,134 B2 11/2005 Hartl et al.
6,964,416 B2 11/2005 Mcclintic et al.
7,018,293 B2 3/2006 Brown et al.
7,029,395 B1 4/2006 Baerlocher
7,029,396 B2 4/2006 Jaffe et al.
7,065,215 B2 6/2006 Shirakawa et al.
7,112,136 B2 9/2006 Anderson et al.
7,121,945 B2 10/2006 Suganuma et al.
7,137,886 B2 11/2006 Locke et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,294,055 B2 11/2007 Baerlocher et al.
7,316,613 B2 1/2008 Luccesi et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Loose et al.
7,488,252 B2 2/2009 Griswold et al.
7,494,412 B2 2/2009 Baerlocher
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,618,319 B2 11/2009 Casey et al.
7,625,278 B2 12/2009 Paulsen et al.
7,628,690 B2 12/2009 Englman et al.
7,631,872 B2 12/2009 Roemer et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,744,460 B2 6/2010 Walker et al.
7,785,191 B2 8/2010 Marks et al.
7,789,744 B2 9/2010 Fiden
7,841,934 B2 11/2010 Gauselmann
7,980,936 B2 7/2011 Mead
8,021,223 B2 9/2011 Rose
8,021,225 B2 9/2011 Okada
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,147,322 B2 4/2012 Walker et al.
8,162,740 B2 4/2012 Aoki
8,162,741 B2 4/2012 Wadleigh et al.
8,192,275 B2 6/2012 Aoki et al.
8,246,442 B1 8/2012 Barrie
8,272,938 B2 9/2012 Gilmore et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,465,358 B2 6/2013 Kemper
8,480,473 B2 7/2013 Villejo et al.
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.

(56) References Cited

U.S. PATENT DOCUMENTS

| | | | |
|---|---|---|---|
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,011,233 | B2 | 4/2015 | Ryan |
| 9,098,847 | B2 | 8/2015 | Basallo et al. |
| 9,098,973 | B2 | 8/2015 | Basallo et al. |
| 9,147,321 | B2 | 9/2015 | Moody |
| 9,165,433 | B2 | 10/2015 | Caputo |
| 9,177,447 | B2 | 11/2015 | Zoltewicz et al. |
| 9,202,345 | B2 | 12/2015 | Zoltewicz et al. |
| 9,214,011 | B2 | 12/2015 | Wei et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,474,972 | B2 | 10/2016 | Lenger |
| 9,495,839 | B2 | 11/2016 | Aoki et al. |
| 9,595,157 | B2 | 3/2017 | Rasmussen et al. |
| 9,633,506 | B2 | 4/2017 | Basallo et al. |
| 9,704,342 | B2 | 7/2017 | Aoki et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,062,237 | B2 | 8/2018 | Devine et al. |
| 10,204,473 | B2 | 2/2019 | Lenger |
| 10,242,533 | B2 | 3/2019 | Okada et al. |
| 10,339,761 | B2 | 7/2019 | Olive |
| 10,366,575 | B2 | 7/2019 | Visser |
| 10,388,112 | B2 | 8/2019 | You et al. |
| 10,410,472 | B2 | 9/2019 | Moody |
| 10,417,877 | B2 | 9/2019 | Gomez et al. |
| 10,475,294 | B2 | 11/2019 | Gomez et al. |
| 10,497,203 | B2 | 12/2019 | Elmqvist |
| 10,672,220 | B2 | 6/2020 | Lenger |
| 10,706,664 | B2 | 7/2020 | Boese et al. |
| 10,726,676 | B2 | 7/2020 | You et al. |
| 10,726,678 | B1* | 7/2020 | Rehill .................. G07F 17/326 |
| 10,769,888 | B2 | 9/2020 | You et al. |
| 10,839,648 | B2 | 11/2020 | Okada et al. |
| 10,957,161 | B2 | 3/2021 | Chesworth et al. |
| 11,017,638 | B2 | 5/2021 | Chesworth et al. |
| 2001/0009865 | A1* | 7/2001 | Demar .................. G07F 17/32 463/20 |
| 2001/0021666 | A1 | 9/2001 | Yoshida et al. |
| 2001/0038178 | A1* | 11/2001 | Vancura ............. G07F 17/3244 273/274 |
| 2002/0016200 | A1 | 2/2002 | Baerlocher et al. |
| 2002/0045474 | A1 | 4/2002 | Singer et al. |
| 2002/0119818 | A1 | 8/2002 | Savio et al. |
| 2002/0155881 | A1 | 10/2002 | Yoshida |
| 2002/0183105 | A1 | 12/2002 | Cannon et al. |
| 2003/0017865 | A1 | 1/2003 | Beaulieu et al. |
| 2003/0027619 | A1 | 2/2003 | Nicastro, Sr. |
| 2003/0035346 | A1 | 2/2003 | Laughlin |
| 2003/0050111 | A1* | 3/2003 | Saffari ............... G07F 17/3255 463/25 |
| 2003/0064782 | A1 | 4/2003 | Beaulieu et al. |
| 2003/0064801 | A1 | 4/2003 | Breckner et al. |
| 2003/0064802 | A1 | 4/2003 | Rodgers et al. |
| 2003/0069063 | A1 | 4/2003 | Bilyeu et al. |
| 2003/0130034 | A1 | 7/2003 | Suganuma et al. |
| 2003/0157980 | A1 | 8/2003 | Loose et al. |
| 2003/0195037 | A1* | 10/2003 | Vuong .................. G07F 17/32 463/29 |
| 2003/0216165 | A1 | 11/2003 | Singer et al. |
| 2004/0012145 | A1 | 1/2004 | Inoue |
| 2004/0023714 | A1 | 2/2004 | Asdale |
| 2004/0038733 | A1* | 2/2004 | Walker ............... G07F 17/3244 463/25 |
| 2004/0043815 | A1 | 3/2004 | Kaminkow |
| 2004/0048646 | A1 | 3/2004 | Visocnik |
| 2004/0092315 | A1 | 5/2004 | Boyd et al. |
| 2004/0137982 | A1 | 7/2004 | Cuddy et al. |
| 2004/0171417 | A1 | 9/2004 | Beaulieu et al. |
| 2004/0172508 | A1* | 9/2004 | Nguyen ............. G06F 11/1666 711/162 |
| 2004/0198489 | A1 | 10/2004 | Kaminkow et al. |
| 2004/0204228 | A1* | 10/2004 | Walker ............... G07F 17/3244 463/20 |
| 2005/0014559 | A1* | 1/2005 | Mattice .............. G07F 17/3241 463/29 |
| 2005/0035550 | A1* | 2/2005 | Jackson ............. G07F 17/3297 273/292 |
| 2005/0054442 | A1 | 3/2005 | Anderson et al. |
| 2005/0056995 | A1* | 3/2005 | Tempest ................ G07F 17/34 463/20 |
| 2005/0130731 | A1 | 6/2005 | Englman et al. |
| 2005/0159208 | A1 | 7/2005 | Pacey |
| 2005/0277457 | A1* | 12/2005 | Wilson ............... G07F 17/3267 463/12 |
| 2006/0009286 | A1 | 1/2006 | Durham et al. |
| 2006/0063588 | A1 | 3/2006 | Poole |
| 2006/0111173 | A1 | 5/2006 | Yang |
| 2006/0142080 | A1 | 6/2006 | Enzminger |
| 2006/0189369 | A1 | 8/2006 | Taylor |
| 2006/0205469 | A1 | 9/2006 | Schultz et al. |
| 2006/0247002 | A1 | 11/2006 | Yoshimi et al. |
| 2007/0057464 | A1* | 3/2007 | Cockrell, Jr. ............ A63F 1/00 273/303 |
| 2007/0060248 | A1 | 3/2007 | Rodgers et al. |
| 2007/0060255 | A1 | 3/2007 | Baerlocher et al. |
| 2007/0060275 | A1 | 3/2007 | Gilmore et al. |
| 2007/0099695 | A1* | 5/2007 | Wilson .................. G07F 17/34 463/25 |
| 2007/0129135 | A1 | 6/2007 | Marks et al. |
| 2007/0149267 | A1 | 6/2007 | Ross et al. |
| 2007/0281784 | A1 | 12/2007 | Seelig et al. |
| 2007/0287529 | A1 | 12/2007 | Kojima |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0039190 | A1* | 2/2008 | Walker .................. G07F 17/32 463/25 |
| 2008/0045298 | A1 | 2/2008 | Yoshizawa |
| 2008/0045320 | A1 | 2/2008 | Kato |
| 2008/0108408 | A1 | 5/2008 | Wolf |
| 2008/0108411 | A1 | 5/2008 | Jensen et al. |
| 2008/0108422 | A1 | 5/2008 | Hedrick et al. |
| 2008/0108431 | A1 | 5/2008 | Cuddy et al. |
| 2008/0132321 | A1 | 6/2008 | Pau |
| 2008/0146346 | A1* | 6/2008 | Hardy ................. G07F 17/329 463/16 |
| 2008/0182647 | A1 | 7/2008 | Brunet De Courssou et al. |
| 2008/0274789 | A1 | 11/2008 | Singer et al. |
| 2009/0036208 | A1 | 2/2009 | Pennington et al. |
| 2009/0156287 | A1 | 6/2009 | Baumgartner |
| 2009/0181755 | A1 | 7/2009 | Gagner et al. |
| 2009/0239634 | A1 | 9/2009 | Nguyen |
| 2009/0291741 | A1 | 11/2009 | Schofield |

(56) References Cited

U.S. PATENT DOCUMENTS

| | | | | |
|---|---|---|---|---|
| 2010/0075737 | A1 | 3/2010 | Bluemel | |
| 2010/0113133 | A1 | 5/2010 | Leupp | |
| 2010/0167815 | A1 | 7/2010 | Gagner et al. | |
| 2010/0203948 | A1* | 8/2010 | Falciglia, Sr. | G07F 17/3265 463/20 |
| 2010/0210343 | A1 | 8/2010 | Englman et al. | |
| 2010/0234092 | A1 | 9/2010 | Gomez et al. | |
| 2010/0304832 | A1 | 12/2010 | Kup-Ferroth | |
| 2011/0244943 | A1 | 10/2011 | Milford et al. | |
| 2011/0300937 | A1 | 12/2011 | Crowder, Jr. et al. | |
| 2012/0015707 | A1 | 1/2012 | Hornik et al. | |
| 2012/0034965 | A1 | 2/2012 | Masen et al. | |
| 2012/0064961 | A1* | 3/2012 | Vancura | G07F 17/3265 463/20 |
| 2012/0077564 | A1 | 3/2012 | Collette et al. | |
| 2012/0094738 | A1 | 4/2012 | Aoki et al. | |
| 2012/0122532 | A1 | 5/2012 | Berman et al. | |
| 2012/0178517 | A1 | 7/2012 | Montenegro et al. | |
| 2012/0220360 | A1 | 8/2012 | Mcallister et al. | |
| 2013/0053124 | A1 | 2/2013 | Masen et al. | |
| 2013/0065663 | A1 | 3/2013 | Johnson et al. | |
| 2013/0102375 | A1 | 4/2013 | Aoki et al. | |
| 2013/0252704 | A1 | 9/2013 | Gilbertson et al. | |
| 2013/0260861 | A1 | 10/2013 | Vann et al. | |
| 2013/0324217 | A1 | 12/2013 | Gilbertson et al. | |
| 2014/0014186 | A1 | 1/2014 | Bhattacharya et al. | |
| 2014/0024429 | A1 | 1/2014 | Aoki et al. | |
| 2014/0051496 | A1 | 2/2014 | Meyer | |
| 2014/0141860 | A1 | 5/2014 | Meyer | |
| 2014/0179396 | A1 | 6/2014 | Aoki et al. | |
| 2014/0274292 | A1 | 9/2014 | Suda | |
| 2014/0323198 | A1 | 10/2014 | Tuck | |
| 2015/0031437 | A1 | 1/2015 | Gomez et al. | |
| 2015/0072770 | A1* | 3/2015 | Simongini | G07F 17/3244 463/25 |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0063799 | A1* | 3/2016 | Reeves | G07F 17/326 463/17 |
| 2016/0155303 | A1 | 6/2016 | Aoki et al. | |
| 2017/0154498 | A1 | 6/2017 | Olive | |
| 2017/0372558 | A1 | 12/2017 | You et al. | |
| 2018/0130303 | A1 | 5/2018 | Lamb | |
| 2018/0268655 | A1 | 9/2018 | Olive | |
| 2018/0268659 | A1 | 9/2018 | Chesworth et al. | |
| 2019/0051097 | A1 | 2/2019 | Marks et al. | |
| 2019/0102977 | A1* | 4/2019 | Adair | G07F 17/3267 |
| 2019/0102992 | A1 | 4/2019 | You et al. | |
| 2019/0236905 | A1 | 8/2019 | Washington et al. | |
| 2020/0242885 | A1* | 7/2020 | Culp | G07F 17/3241 |
| 2023/0106453 | A1* | 4/2023 | Visser | G06F 7/588 463/31 |
| 2023/0267798 | A1* | 8/2023 | Kendall | G06F 7/588 463/20 |
| 2024/0177567 | A1* | 5/2024 | Hornik | G07F 17/3244 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

GAMING SYSTEM AND METHOD WITH A PERSISTENT ELEMENT FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to technological improvements in connection with a persistent element feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

There are provided a gaming machine and method that utilize game-logic circuitry and a presentation assembly configured to present a plurality of symbol-bearing base reels, a base array, and a plurality of persistent elements. The plurality of base reels are spun and stopped to land symbols from the base reels in the base array. In response to the landed symbols including at least one accumulation symbol, an animation of addition of the accumulation symbol to one of the plurality of persistent elements is presented. An animation of the accumulation symbol being added to one or more of the plurality of persistent elements in a cascading fashion may also be presented. A random determination whether or not to trigger one or more game features is made. If the determination is to trigger the one or more game features, the one or more game features are implemented via the game-logic circuitry and the presentation assembly.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to the awarding of one or more game features and a bonus game that may be triggered as a result of the awarding of the game features.

Figure 1:
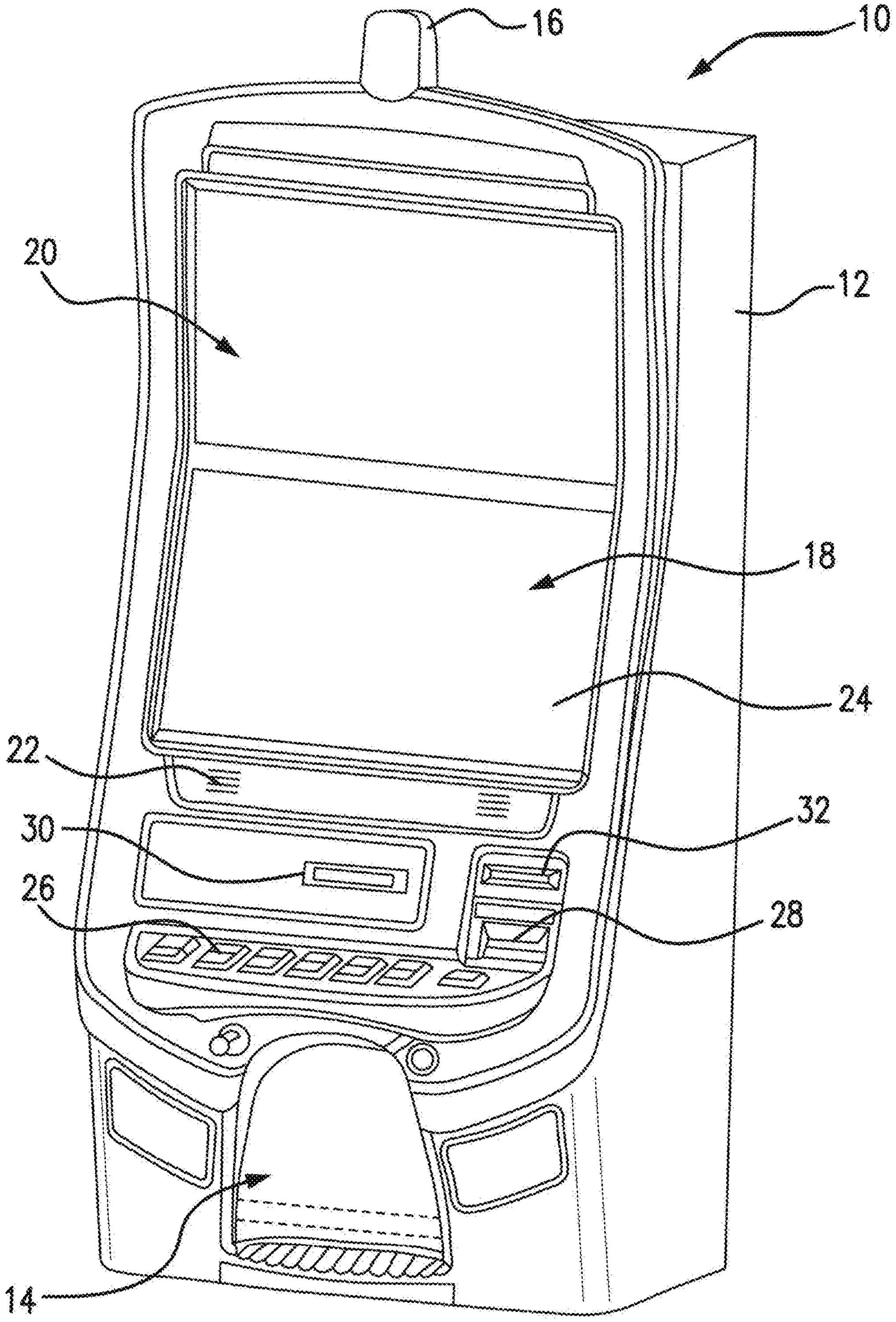
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a “presentation assembly” of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
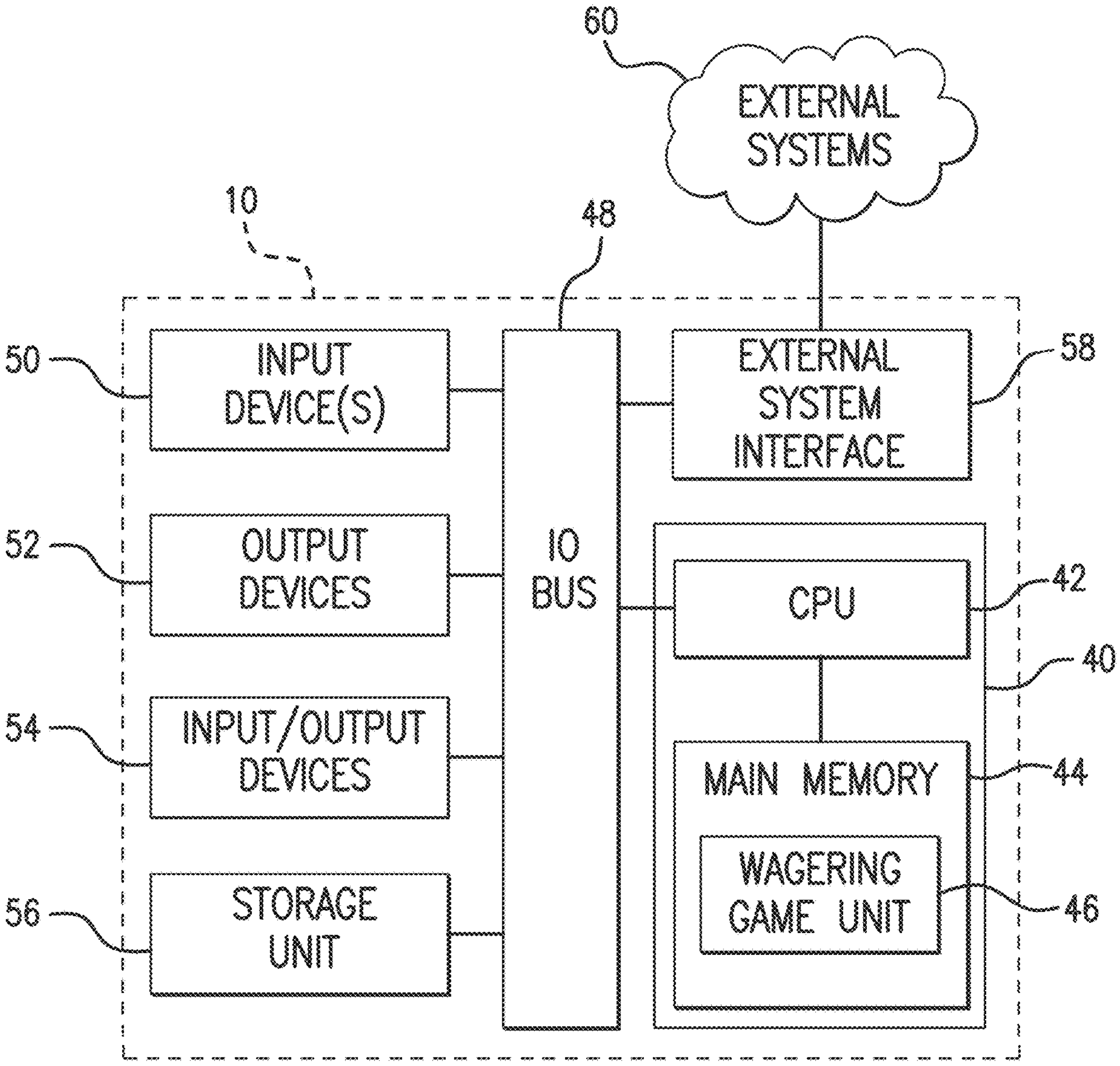
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
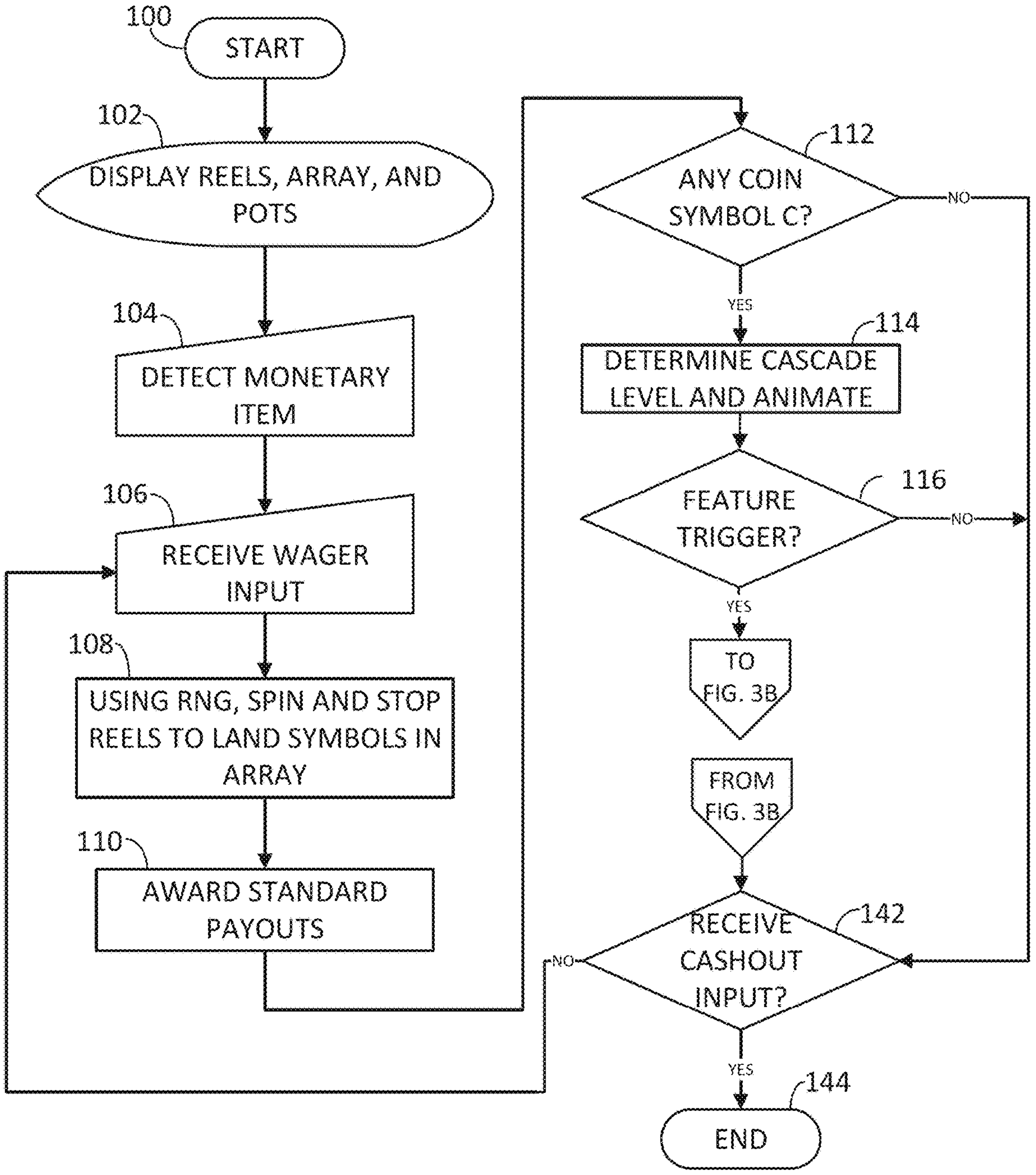
FIGS. 3A and 3B are a flow diagram for a data processing method that corresponds to instructions executed by a controller, according to an embodiment of the present invention.
Figure 3B:
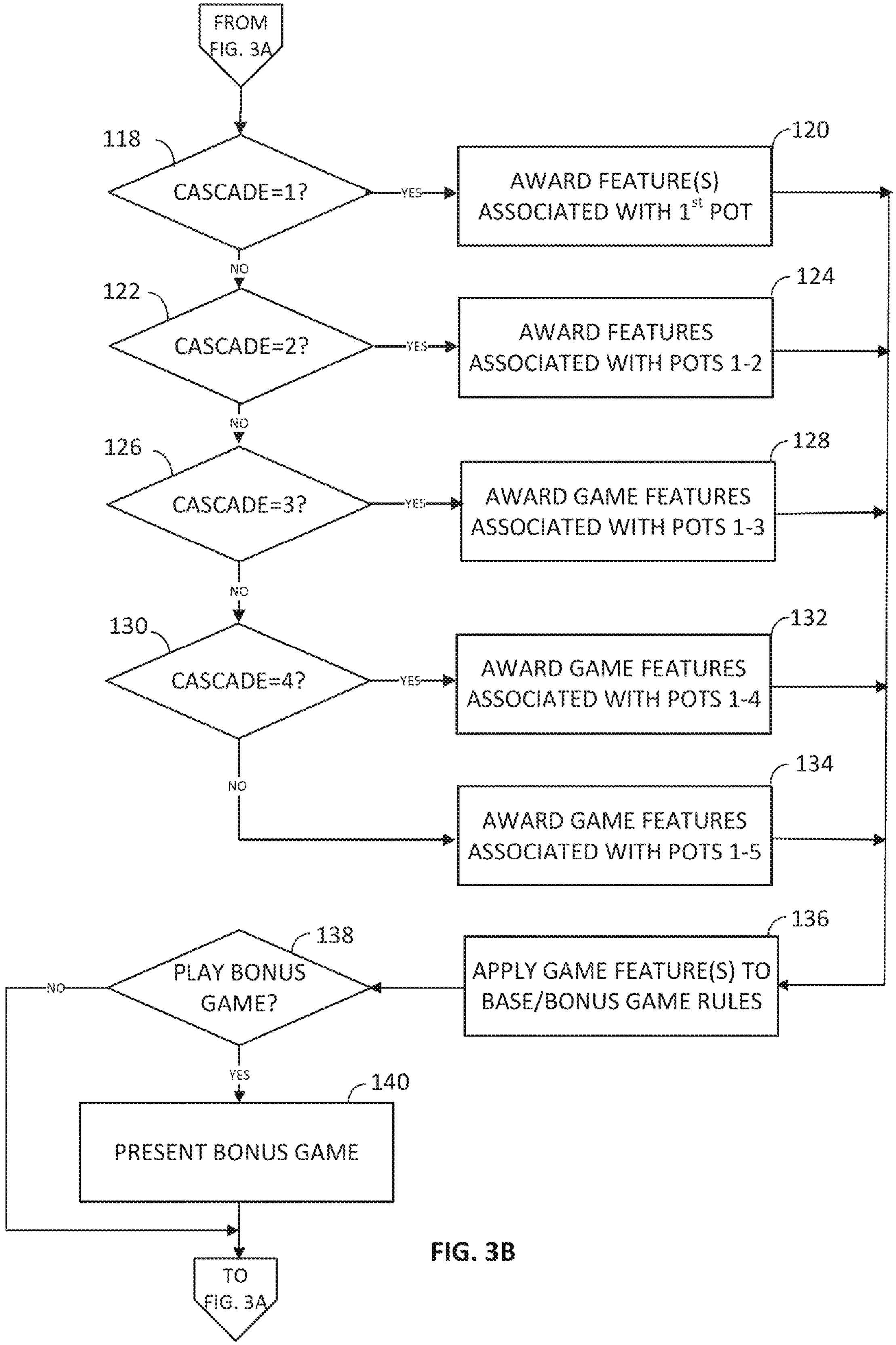

Referring now to FIGS. 3A-3B, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of spin outcomes in FIGS. 4, 5A-5E and 6.

Referring to FIG. 3A, the data processing method commences at step 100. At step 102, the game-logic circuitry controls one or more presentation devices (e.g., mechanical-reel display device, video display device, or a combination thereof) to present a plurality of symbol-bearing reels, an array of symbol positions, and a plurality of persistent elements (e.g., one or more coin pots, FIGS. 4-6, elements 212-220). Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games utilizing the array.

Figure 4:
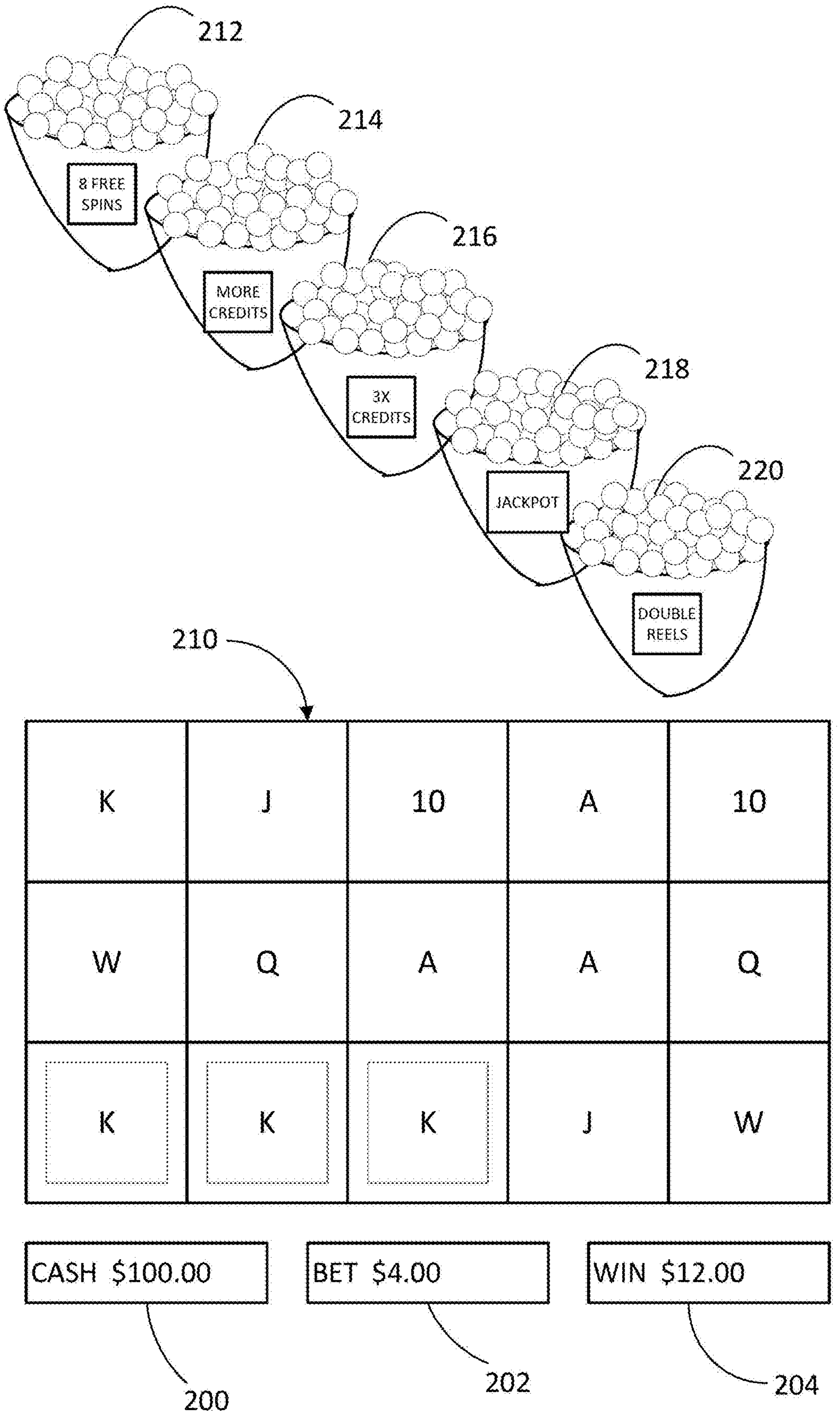
FIG. 4 is an exemplary presentation of a base-game spin outcome resulting from the flow diagram in FIG. 3A.

Referring to FIG. 4, which illustrates an example of the display at the conclusion of a first representative base game spin, the symbol array 210 in the base game has a three-by-five rectangular configuration, and each symbol position is associated with a respective independent reel. The reels bear a plurality of symbols that may, for example, include royal symbols 10, J, Q, K, and A; a wild symbol W that can substitute for any of the royal symbols; and a generic coin symbol C.

In one or more embodiments, the generic coin symbols C may also be value-bearing symbols, otherwise known as WYSIWYG ("What You See is What You Get") or "cash on reels" symbols. Each value-bearing symbol is associated with a credit or currency value indicated on the symbol itself. The value on a particular credit-bearing symbol may be fixed or variable (e.g., random) from one game cycle to the next. Different value-bearing symbols on the reels may have different values. In one or more embodiments, a value-bearing symbol may be associated with a value determined or displayed separately. For example, rather than a specific amount, a GRAND, MAJOR, MINOR, or MINI award label may be indicated on a value-bearing symbol. Each reel may contain one or more stacks (i.e., clumps) of value-bearing symbols that appear adjacent to each other along the reel. The values of the value-bearing symbols in any given stack may be the same or different. A stack of value-bearing symbols may consist of two, three, four, or more adjacent symbols. Further, adjacent reels may contain one or more "mega" value-bearing symbols that move as one block as the reels spin. When the spin is complete, each individual row and column of the array underlying any visible portion of the "mega" symbol is assigned the value associated with the "mega" value-bearing symbol. For example, a "mega" value-bearing symbol may comprise two-row high square spanning the first two columns of the array 210. If this symbol stops aligned with the top two rows of the array 210, the symbols in the first two rows and first two columns would all be treated as though individual value-bearing symbols having the value of the "mega" symbol had landed in those locations.

At step 104, the game-logic circuitry detects, via a value input device, a physical item associated with a monetary value that establishes a monetary balance in the form of cash or credits. In FIGS. 4-6, the monetary balance may be shown on a meter 200.

At step 106, the game-logic circuitry initiates a base game of a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4-6 the wager may be shown on a bet meter 202.

At step 108, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIG. 4 depicts a base-game spin outcome.

At step 110, the game-logic circuitry awards standard payouts in accordance with a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 4, for example, depicts a line pay of three K symbols in the bottom row of the array 210. The awarded pay is added to a win meter 204.

At step 112, the game-logic circuitry determines whether any coin symbols C are present in the array. If not, the method proceeds to step 142, described below. If so, at step 114, a cascade level M is randomly determined, where M may vary from 1–N, where N is the number of persistent elements. In the examples illustrated here in FIGS. 4-6 and in the flow diagrams of FIGS. 3A-3B, N=5. FIGS. 5A-5E illustrate an example of the display at the conclusion of a second representative base game spin with different cascade levels from 1 to 5.

Figure 5A:
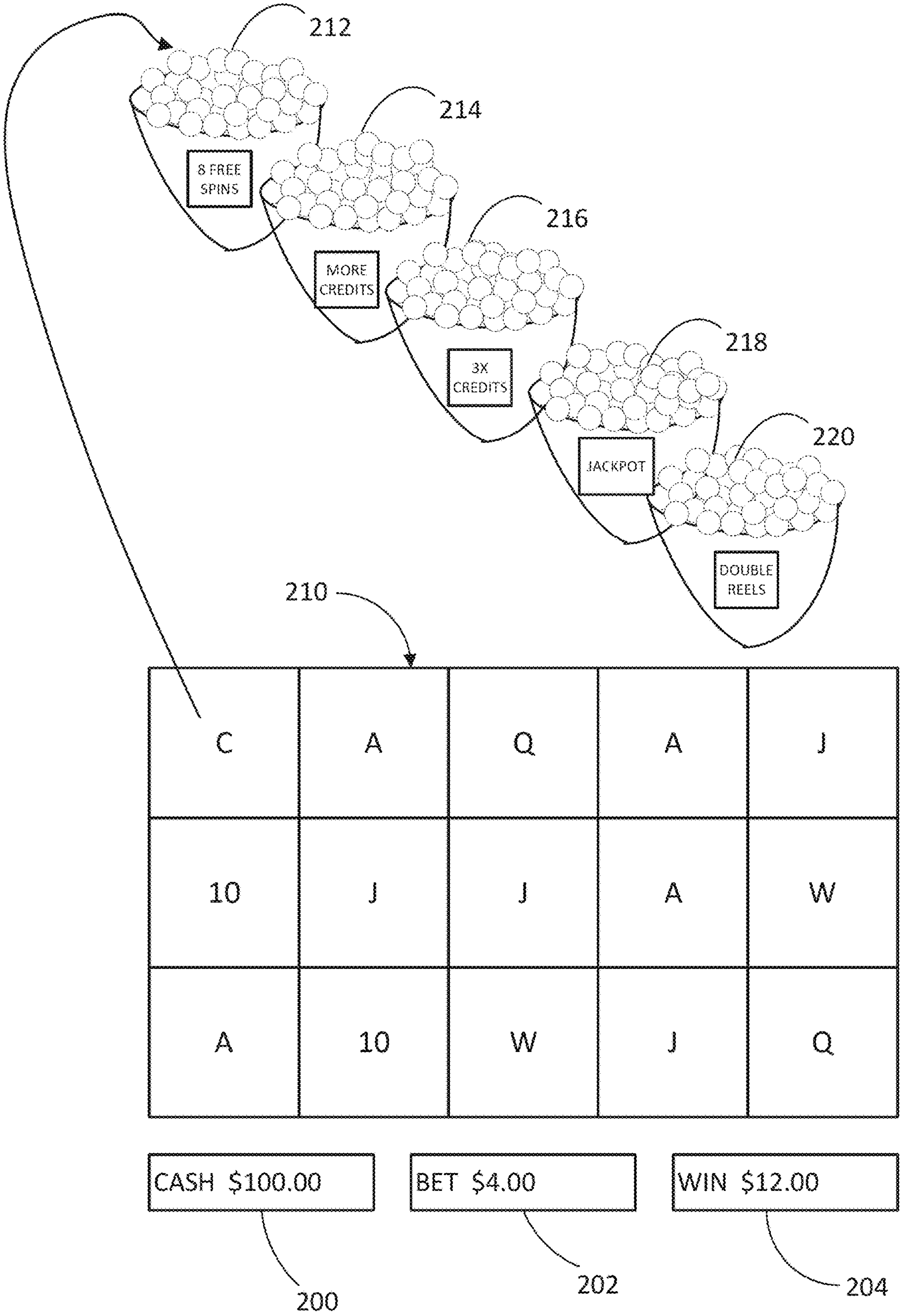
FIGS. 5A-5E are exemplary presentations of a cascading animation feature in accordance with one or more embodiments.
Figure 6:
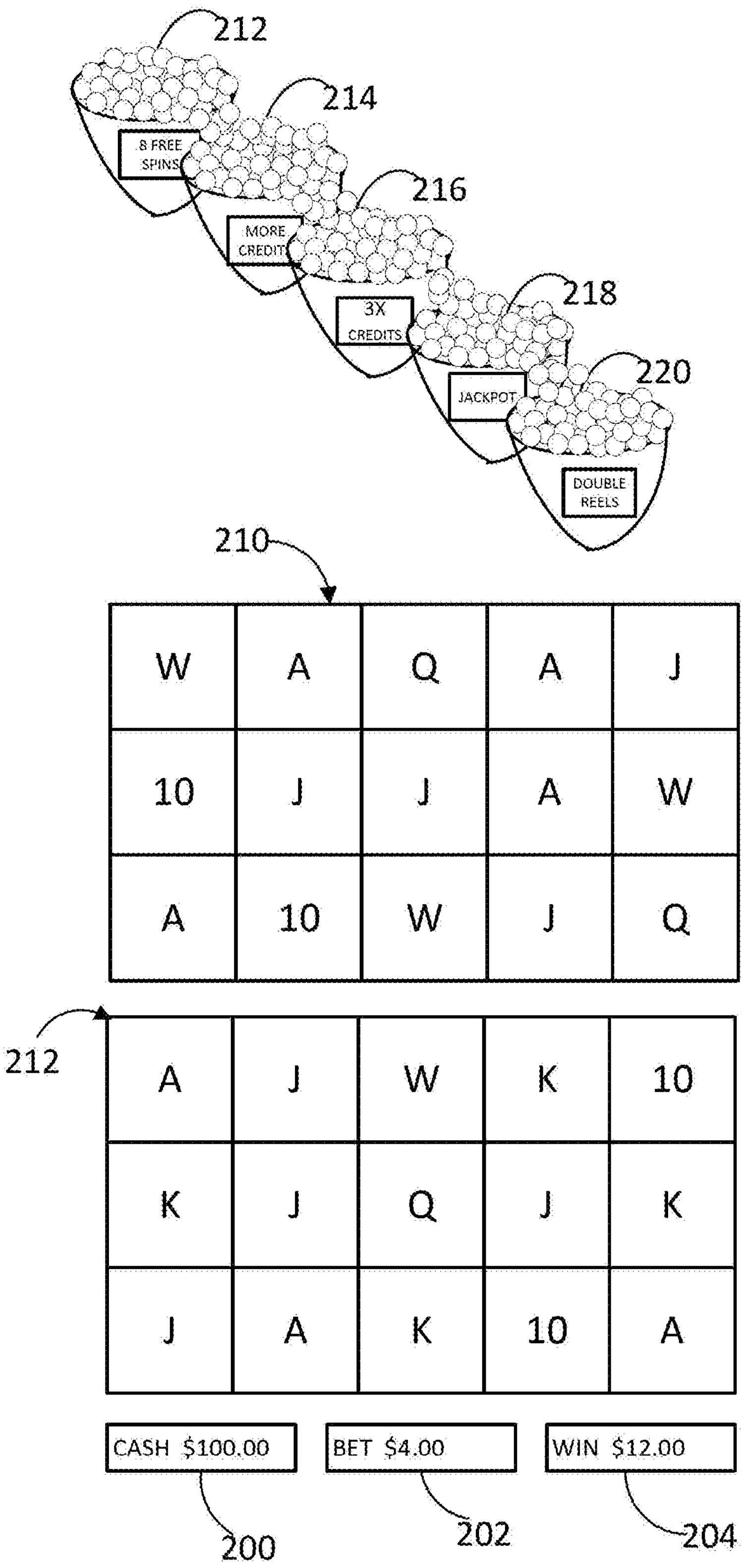
FIG. 6 is an exemplary presentation of an additional reel array in accordance with one or more embodiments.

FIG. 5A: If the cascade level M is one, the game-logic circuitry animates the addition of each coin symbol C, also known as an accumulation symbol, to a first persistent element such as a first coin pot (FIG. 4; 212) of a set of coin pots (212, 214, 216, 218, 220). For example, the coin symbol C in the first column of FIG. 5A may be animated to "fly" off the array and land in the middle of coin pot 212. To represent the addition of the coin symbol to the coin pot, the pot and/or the volume of coins therein may appear to grow in size. In FIG. 5A, the transfer of the coin symbol C to the coin pot 212 is represented by an arrow.

The persistent elements may take forms other than the coin pots 212, 214, 216, 218, 220, including, for example, money bags, urns, vases, jars, jugs, cans, bowls, piggy banks, beehives, inflating balloons, ladders, dials, meters, etc. Similarly, the accumulation symbols need not be coins and may be any designated symbol. In accordance with some embodiments, a persistent element may be an object of fixed size accompanied by some other indication of accumulating value, for example, by a gradual change in color. In other embodiments, the persistent element may change size and also show some other indication of increasing value, for example, the color of the display in the immediate area of the persistent element may gradually change as its value increases.

Figure 5B:
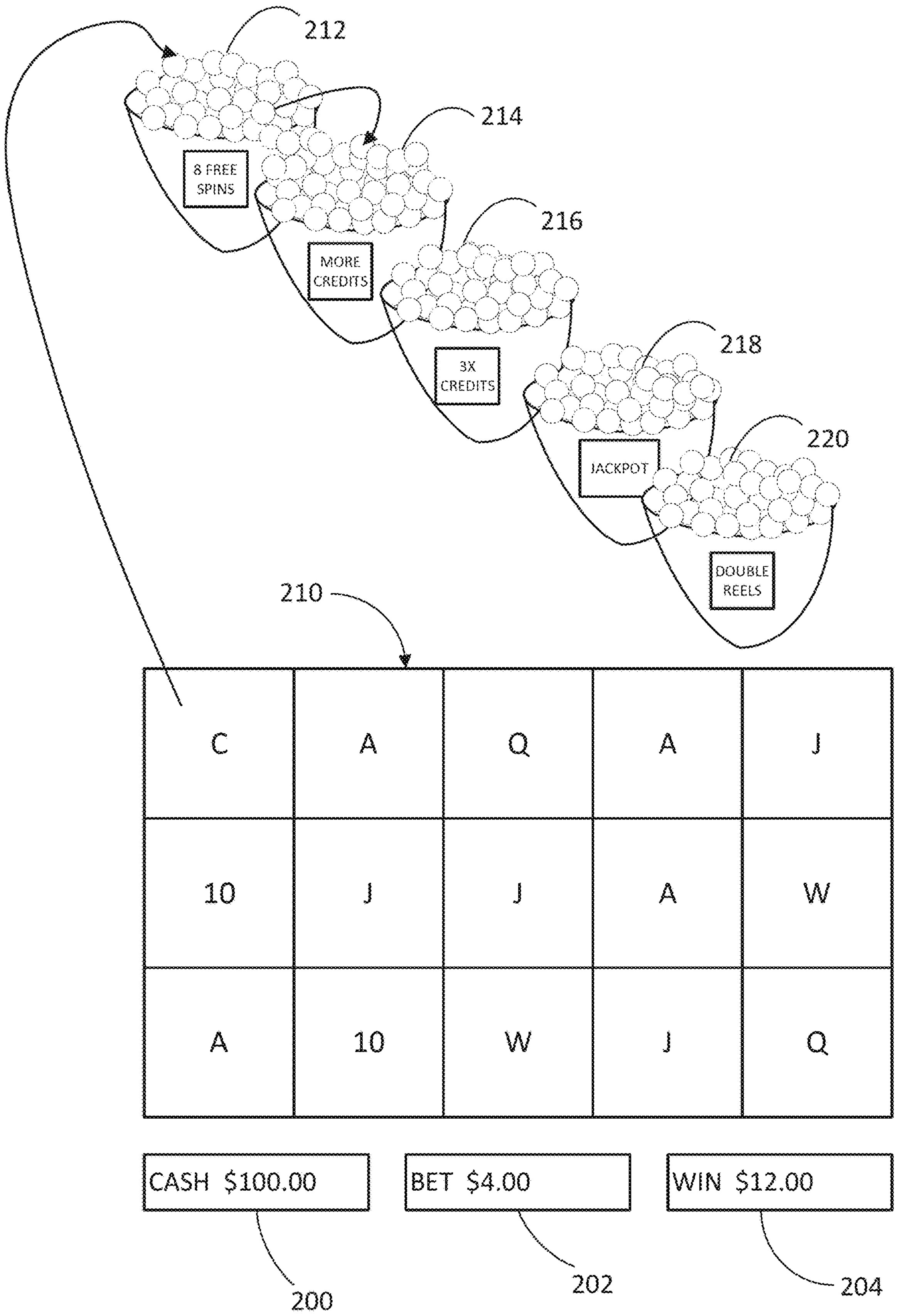

FIG. 5B: If, at step 114, the cascade level M is two, some of the coins in the first coin pot 212 may appear to transfer or spill into the second coin pot 214, as represented by the additional arrow between those coin pots in FIG. 5B. The number of coins transferred is not important. Even a single coin transferred from coin pot 212 to coin pot 214 visually indicates that the cascade number M includes coin pot 214. This applies to all other coin transfer animations described below with respect to FIGS. 5C-5E.

Figure 5C:
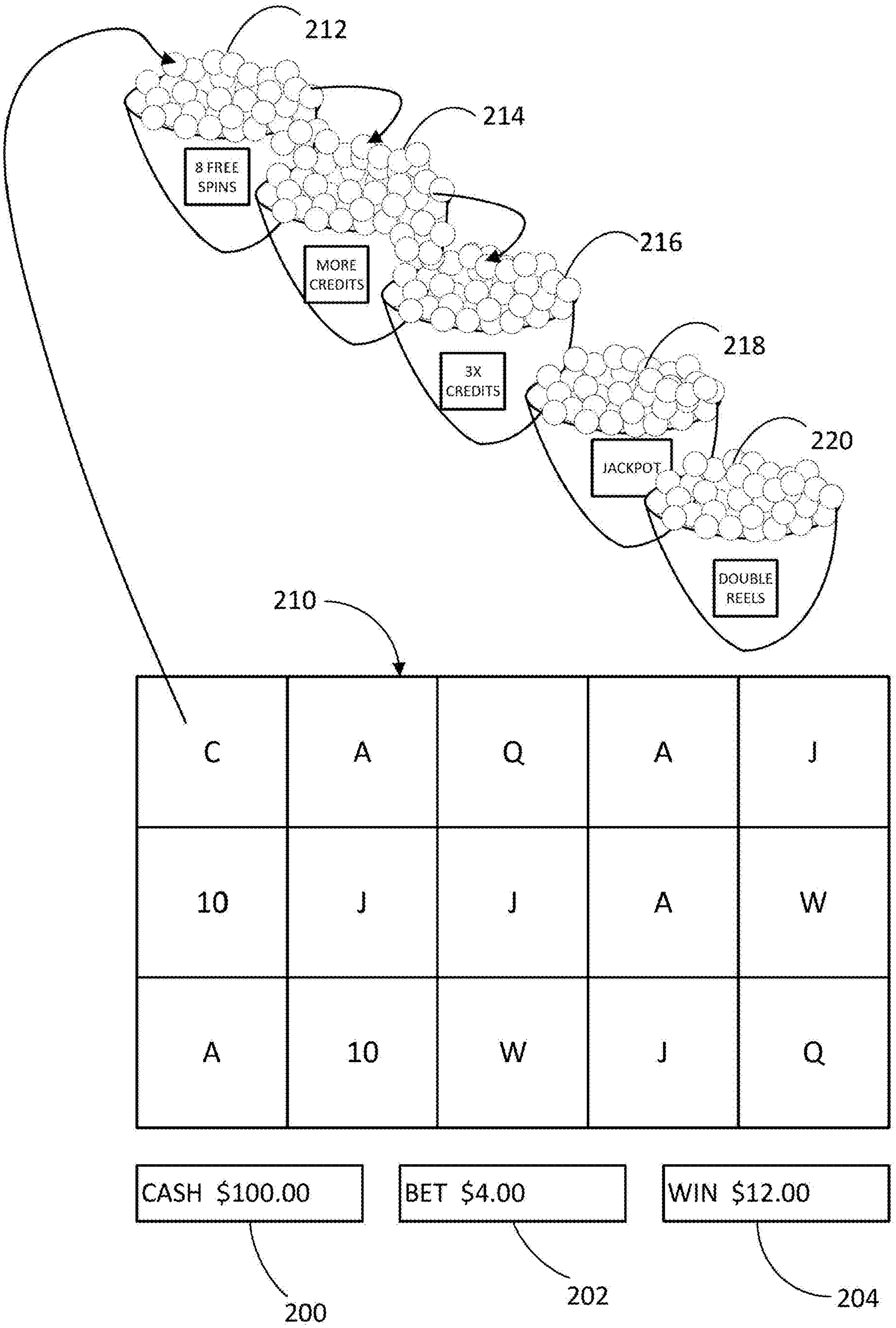

FIG. 5C: If the cascade level M is three, some of the coins in the second coin pot 214 may appear to further transfer or trickle into the next coin pot 216, as represented by the third arrow between those coin pots in FIG. 5C.

Figure 5D:
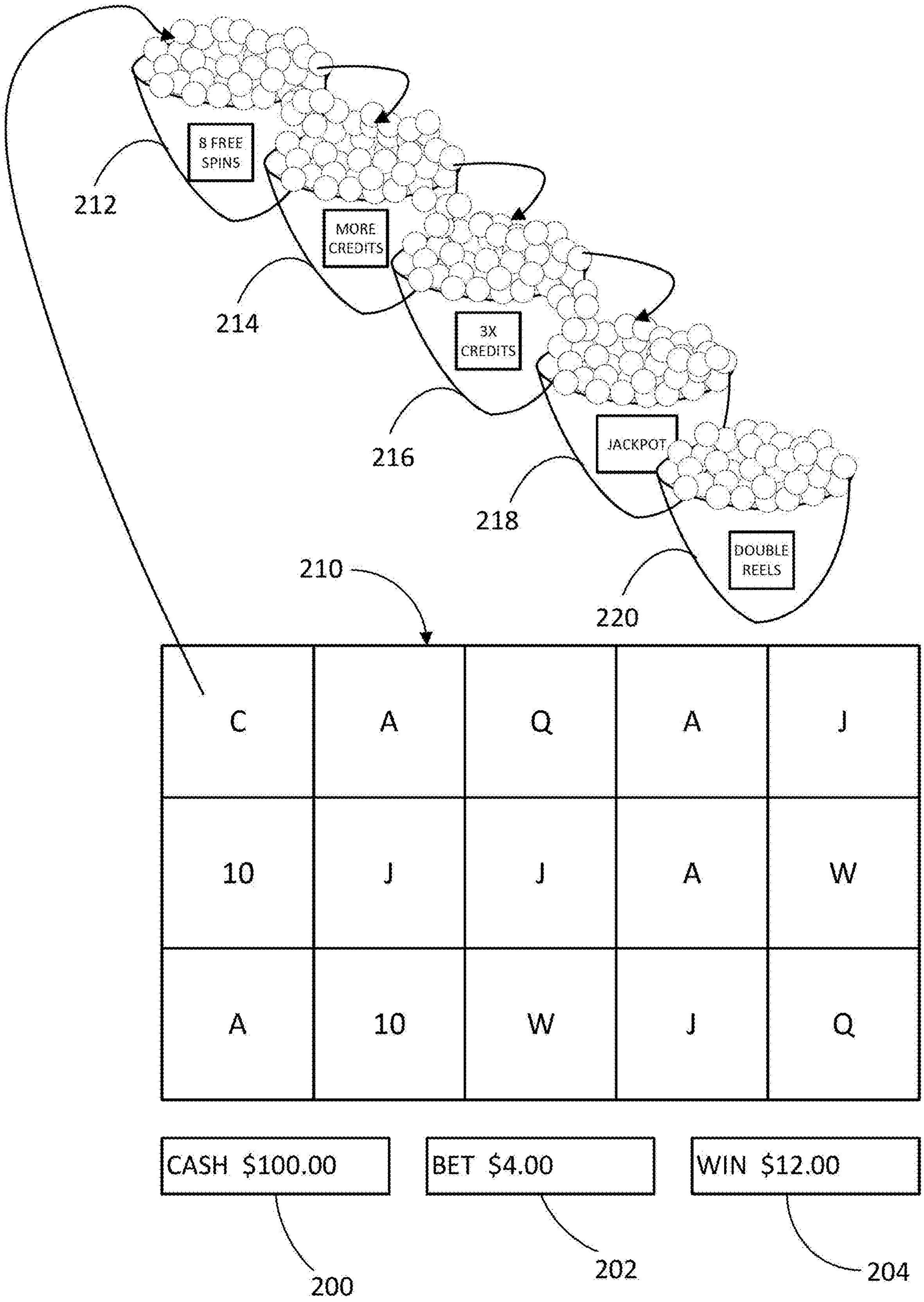

FIG. 5D: If the cascade level M is four, some of the coins in the third coin pot 216 may appear to transfer or flow into the next coin pot 218, as represented by the fourth arrow between those coin pots in FIG. 5D.

Figure 5E:
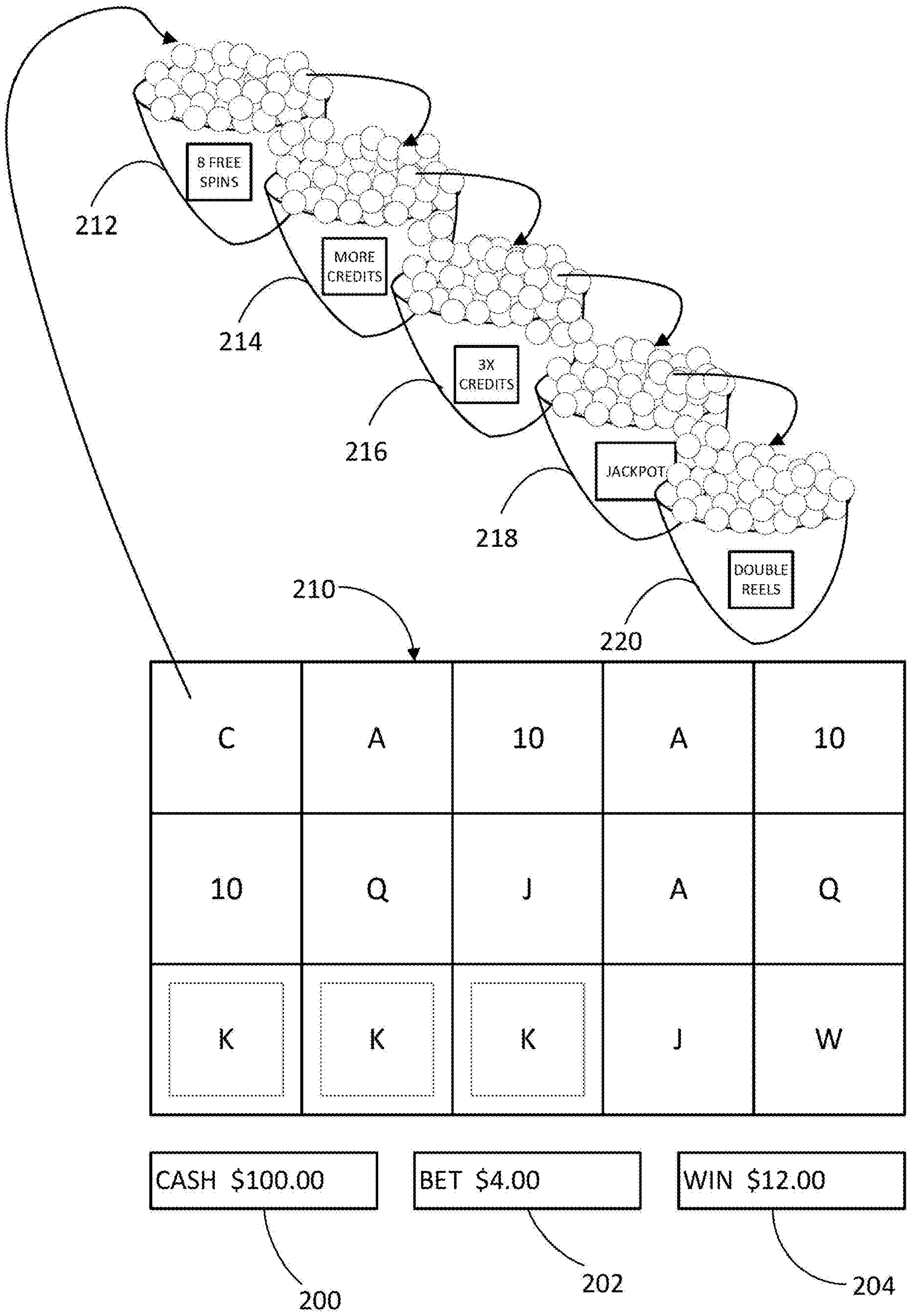

FIG. 5E: Finally, if the cascade level M is equal to five, some of the coins in the fourth coin pot 218 may appear to transfer or fall into the fifth coin pot 220, as represented by the arrow between those coin pots in FIG. 5E.

During a gaming session, the growth in size of the coin pots 212, 214, 216, 218 and 220 in FIGS. 5A-4E may persist from one wagering game cycle to the next such that the player perceives that the game feature associated with a given coin pot may be getting closer to being triggered. This kind of game is known as a "perceived persistence" game. Unlike a true "persistence game," wherein the size of each coin pot or the observable quantity of its contents serves as an indication of the probability that its associated game feature will be triggered. In both cases, when the game feature associated with a coin pot is triggered, at least some of the contents of the coin pot are visually removed and the visual accumulation of coins in that pot during subsequent game spin cycles resumes from that point.

In the perceived persistence embodiments described here, at step 116, if at least one accumulation symbol appeared in the array, causing the determination of a cascade level and its associated animation, the game-logic circuitry randomly determines, via the RNG, whether or not to trigger one or more game features of varying types, as described below. This random determination is independent of any prior wagering game cycles. In accordance with one or more embodiments, if multiple accumulation symbols appear in the array, the odds of triggering the awarding of game features in steps 118-140 may increase according to the number of coins added to the coin pots from the array. This may be accomplished, for example, by changing weights associated with the random determination. In other embodiments, the transfer of multiple accumulation symbols from the array to the coin pot(s) has no effect on the probability of awarding the game features associated with the coin pots.

If a game feature is not triggered at step 116, the spin cycle is complete, and the game-logic circuitry proceeds to step 142. If, however, at least one game feature was triggered at step 116, the game-logic circuitry instead proceeds to the flow in FIG. 3B.

Depending on the cascade level M determined in step 116, it is possible for more than one game feature to be applied to the game. At step 118, if the cascade level M determined at step 116 is equal to one, as illustrated by the animation example of FIG. 5A, the game logic circuitry awards the game feature associated with the first coin pot 212 to the game at step 120, otherwise the game-logic circuitry continues the flow at step 122.

In some embodiments, a game feature simply awards a prize, for example a fixed or progressive jackpot amount. In some embodiments, a game feature may comprise any type of bonus game. Non-limiting examples of bonus games include a certain number of free games (i.e., spins of the reels), a "pick' em" bonus game, a wheel-spinning game, etc. In embodiments offering a free spin bonus game, the free spins may be played as a "hold and spin" game in which certain types of symbols, once landed in the array, are held in place and persist in the array for at least one additional free spin cycle. These persistent symbols may include value-bearing ("WYSIWYG") symbols, wild symbols or other symbols that may improve the chances of winning or provide higher pays. In still other embodiments, a bonus game may be played to determine a game enhancement (described further below) or payment of prize, for example, a fixed or progressive jackpot (described above). The game enhancement may be applied to an outcome of the bonus game, the current base game or one or more future play cycles of the same bonus game, a different bonus game or the base game. In some embodiments, a game feature may comprise an enhancement to the game. An enhancement may include, without limitation, pay table modifiers such as multipliers, increased values on value-bearing symbols, modification to the reels to include improved symbols, such as wild symbols or symbol weights or the removal of certain "blocking symbols", additional rows or columns added to the array, additional free spins, replacement symbols for symbols already present in the array, etc. The enhancement may be applied to the current base game outcome or may be applied to one or more subsequent bonus games or wagered base game plays. In some embodiments, a game feature may provide a second plurality of symbol-bearing reels and a second array of symbol positions to be filled, as described above, for a certain number of game cycles. Each game feature has a different impact on the expected value (EV) of the game. The relative frequency of the game features may be controlled by adjusting which coin pot they are associated with in the cascade sequence, for example. Thus, a less lucrative game feature may be won more frequently, for example, approximately once in every ten game spin cycles, while a higher paying game feature may only occur approximately once in every one hundred game spin cycles according to a weighted cascade value determination. This allows game features to be triggered more often, for player enjoyment, while maintaining the overall expected EV of the wagering game.

In the example shown, the game feature associated with coin pot 212 is a number of free spins. Once the enhancement has been awarded at step 120, typically accompanied by additional animations celebrating the win, the game logic circuitry proceeds to step 136 to apply the game feature to the game. In this case, a bonus game including a number of free games, for example, eight, will be initiated at steps 138-140 before the method returns to the flow in FIG. 4A.

At step 122, if the cascade level M determined at step 116 is equal to two, animated in step 114 as illustrated by the example of FIG. 5B, the game logic circuitry awards the game feature associated with the first coin pot 212 and the game feature(s) associated with the second coin pot 214 to the game, otherwise the game-logic circuitry continues the flow at step 126. In the example shown, the game feature associated with the second coin pot 214 is additional credits added to any value-bearing symbols that may appear on the reels in the present array, in the free games associated with the first coin pot 212 (still to be played), or both. Once both of these game features have been awarded at step 124, the game logic circuitry proceeds to step 136 to apply them to the base and/or the bonus game.

At step 126, if the cascade level M determined at step 116 is equal to three, animated in step 114 as illustrated by the example of FIG. 5C, the game logic circuitry awards the game feature associated with the first coin pot 212, the game feature associated with the second coin pot 214 and the feature associated with the third coin pot 216. In the example shown, the game feature associated with the third coin pot 216 is a 3× credit multiplier applied to any winning outcomes of the present array, in the free games associated with the first coin pot 212 (still to be played at step 140), or both. Once the three enhancements have been awarded at step 128, the game logic circuitry proceeds to step 136 to apply all three of the game feature(s) to the base and/or the bonus game.

Figure 7:
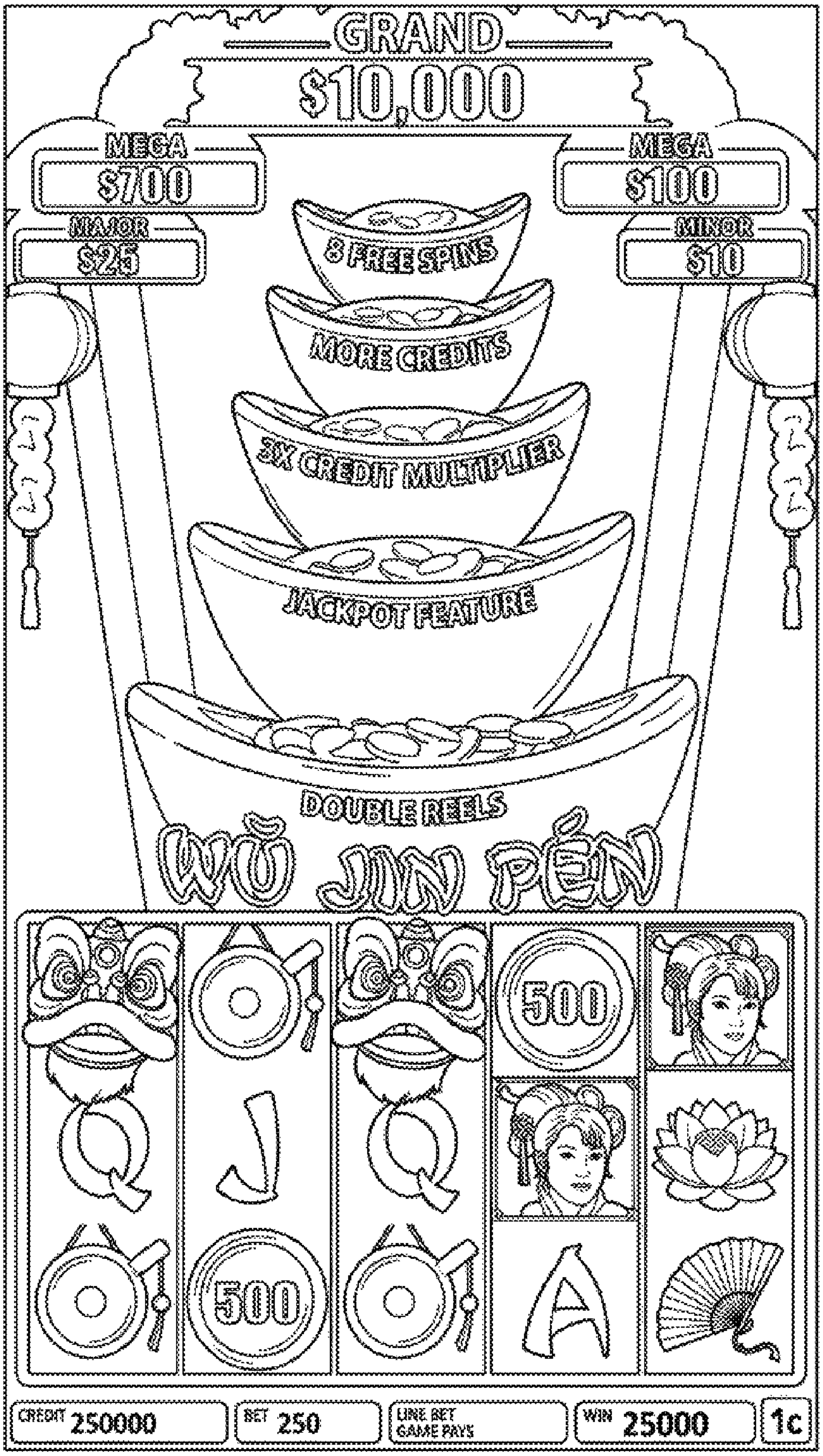
FIG. 7 is an exemplary presentation of one or more jackpots that may be won as the result of a jackpot game feature awarded in accordance with one or more embodiments.

At step 130, if the cascade level M determined at step 116 is equal to four, animated in step 114 as illustrated by the example of FIG. 5D, the game logic circuitry awards the game features associated with the first coin pot 212, the game feature associated with the second coin pot 214, the game feature associated with the third coin pot 216, and the game feature associated with the fourth coin pot 218. In the example shown, the game feature associated with the fourth coin pot 218 is a jackpot feature wherein value-bearing symbols with prizes such as the MINI, MINOR, MAJOR, MEGA or GRAND jackpot (see the example of FIG. 7) may be substituted for one or more value-bearing coins in the present array or which may land in the array during the free games associated with the first coin pot 212 (still to be played at step 140), or both. Once the enhancements have been awarded at step 132, the game logic circuitry proceeds to step 136 to apply all four of the game features to the base and/or the bonus game.

At step 134, the cascade level M determined at step 116 was equal to five, animated in step 114 as illustrated by the example of FIG. 5E. The game logic circuitry awards the game features associated with the first coin pot 212, the game feature associated with the second coin pot 214, the game feature associated with the third coin pot 216, the game feature associated with the fourth coin pot 218 and the game feature associated with the fifth coin pot, 220. In the example shown, the game feature associated with the fifth coin pot 220 introduces a second array 212, an example of which is illustrated in FIG. 6, for use in the bonus game to be played at step 140. Once the five game features have been awarded at step 134, the game logic circuitry proceeds to step 136 to apply all five of the game feature(s) to the base and/or the bonus game. It is emphasized that all of the game features associated with coin pot 216 through coin pot 220, at which point the cascade ended, are awarded. All of the awarded game features affect one or more outcomes of the base and/or bonus game together. In this example of all of the exemplary game features having been awarded, the game-logic circuitry will present a bonus game of eight free spins with enhanced values on any value-bearing symbols that appear in the array during the free spins. A 3× multiplier will be applied to any winning combinations during the free spins and opportunities to win special jackpots (FIG. 7) will be available. Finally, a supplemental array to which all of the other game features will also be applied (FIG. 6, element 212) will be added to the game during the free spins.

At step 138, once all of the game features have been awarded at one of steps 120, 124, 128, 132 or 134, the game-logic circuitry decides whether a bonus game has been awarded. If no bonus game has been awarded, flow returns to FIG. 3A. In the example shown, a bonus game is always awarded because the game feature associated with the first coin pot 212 is a bonus game comprising a number of free spins, however, this may not be the case in other embodiments, as will be described further below. If, at step 138, it is determined that a bonus game was awarded, the game-logic circuitry executes play of the bonus game at step 140 before the flow returns to FIG. 3A. The bonus game may take any form, however, in the example of a number of free spins, the game-logic circuitry may control one or more presentation devices (e.g., mechanical-reel display device, video display device, or a combination thereof) to present a bonus game array and number of reel spins to populate the array with symbols to be evaluated according to a pay table and any of the other game features won from the coin pots. The bonus game array may have the same configuration as the base game array or may have a different configuration than the base game array.

At step 142, the game-logic circuitry determines whether or not it has received a cashout input via at least one of the one or more player input devices of the gaming machine. If it has not received a cashout input, the game-logic circuitry waits for the next wager input at step 106. If it has received a cashout input, the game-logic circuitry initiates a payout from the monetary balance on the meter 200 in FIGS. 4-6. The data processing method then ends at step 144.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature triggering process, if no accumulation coin symbol C appears in the array at step 112, the game-logic circuitry foregoes any random determination of whether a game feature will be awarded. Furthermore, if any coin symbols do appear in the array, regardless of the number of pots and associated game features that may be won in parallel, only a single invocation of the RNG at step 116 is required to determine whether any game feature will actually be triggered. In contrast, in typical prior art systems with mystery bonus triggers, the game-logic circuitry makes a random determination in each and every wagering game cycle and for each and every game feature that may be won, thereby reducing processing efficiency compared to the method presented herein.

Some embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. Further, the process collects displayed values borne by special symbols (i.e., value-bearing symbols) on award elements, such as a segmented wheel, and selects one of the collected values from the award elements according to stored, variable criteria. In this way, the value-bearing symbols and award elements provide building blocks for innumerable different collection and selection sequences simply by manipulating the criteria associated with the value-bearing symbols and award elements, resulting in fewer rules needed for the award process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

In this description, numerous specific details are set forth. However, it is understood that embodiments of the invention may be practiced without these specific details. While the examples given are for a perceived persistence game, certain embodiments may include true persistence aspects as well. For example, the number of free spins associated with coin pot 212 may be a variable attribute associated with the game feature and persist from one wagering game cycle to another. In these cases, as an example, a step between steps 114 and 116 of the method of FIGS. 3A-3B may randomly increase the number of free spins each time at least one coin is added to coin pot 212. The number of free spins may be reset to an initial value, for example, eight, whenever the game feature is awarded. In a second example, the multiplier attribute associated with the credit multiplier game feature of coin pot 216 may be similarly modified.

In other embodiments, the first coin pot to receive a coin symbol C from the array need not be the first coin pot 212. An RNG determination may select any of the other coin pots 214-220 as the first coin pot to start any cascading sequence to be animated at step 214. For example, the first coin pot may be coin pot 216 and the last coin pot may be coin pot 218. In this case, the animation would show one or more coins from the array entering coin pot 216 and cascading into only coin pot 218. The game features awarded would be a 3× credit multiplier and a jackpot feature awarded to one or more iterations of the base game only since the free spin bonus game associated with coin pot 212 would not be awarded.

Figure 8:
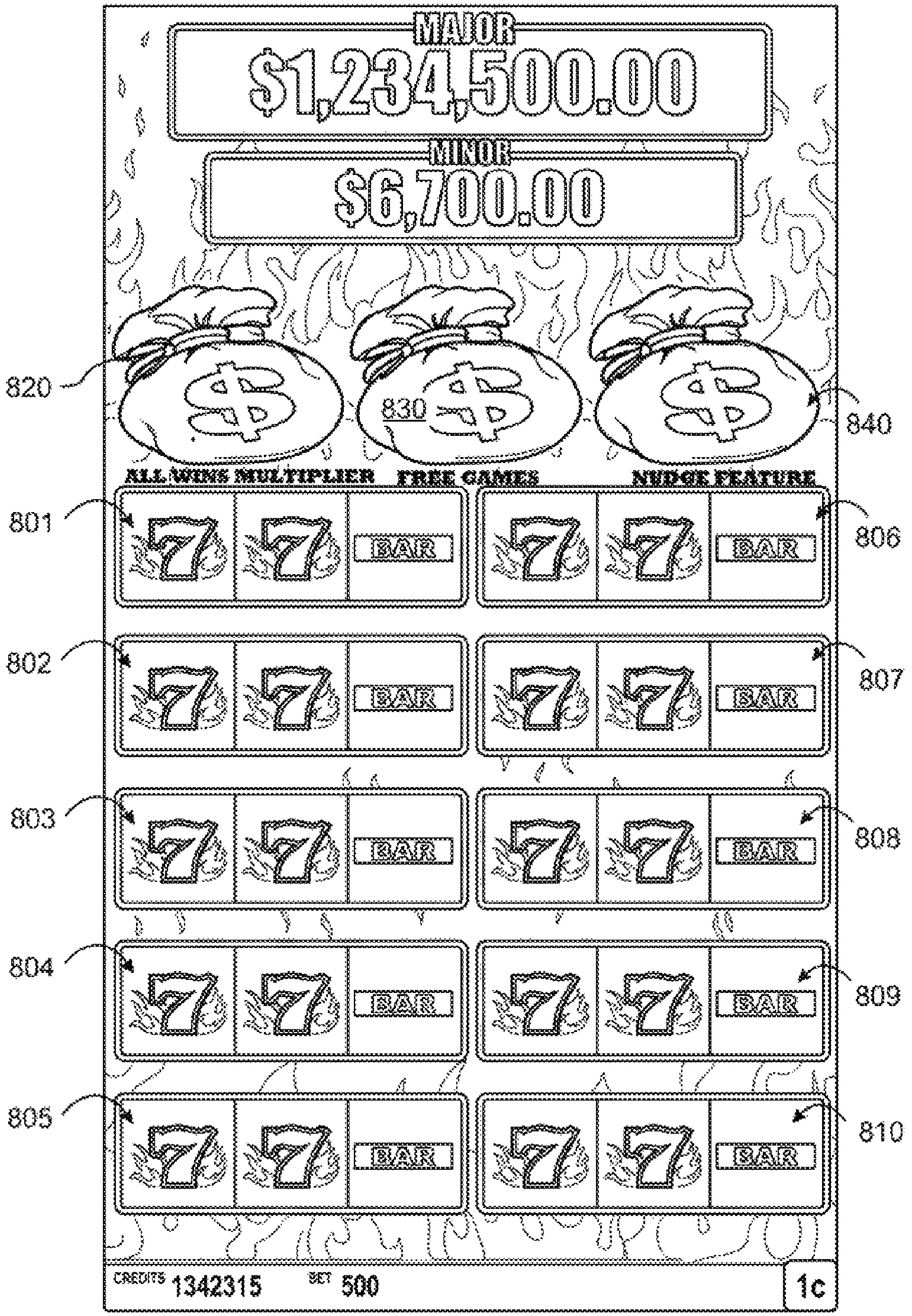
FIG. 8 is an exemplary presentation on a game including a plurality of reel arrays in accordance with one or more embodiments.

In the example of FIG. 6, a supplemental array 212 associated with the "double reels" game feature of coin pot 220 is illustrated. In accordance with some embodiments, there may be multiple supplemental arrays. In other embodiments, the base game may include multiple arrays to which game features associated with the coin pots of the game may be applied. In the example of FIG. 8, the game includes ten 1×3 arrays 801-810, each of which may benefit from the awarding of one or more game features associated with the three money bag persistent elements 820, 830 and 840.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the gaming machine including a gaming cabinet and game-logic circuitry secured within a locked box inside the gaming cabinet, the game-logic circuitry including memory storing programming for a random number generator (RNG) that cycles continuously in the background between games and during game play at a speed that cannot be timed by the player and a wagering game, the method comprising the operations of:

- prior to executing the wagering game executing an authentication program on the gaming machine to authenticate the programming;
- conducting, by the game-logic circuitry operating in an authenticated state, a base game including:
  - presenting, by a presentation assembly, a plurality of symbol-bearing base reels, a base array, and a plurality of N persistent elements, each persistent element having an associated game feature;

spinning and stopping the plurality of symbol-bearing base reels to land symbols from the symbol-bearing base reels in the base array; and in response to the landed symbols including at least one accumulation symbol and while operating in the authenticated state:

determining a randomly determined cascade level M from 1 to N using an output generated by the RNG;

based on the determined cascade level M, causing, by the game-logic circuitry, the presentation assembly to animate an addition of the at least one ac on symbol to a first one of the N plurality of persistent elements and to further animate transference of the at least one a cumulation symbol from the first one of the plurality of persistent elements to a subsequent number of persistent elements equal to M minus one, thereby defining a set of M cascaded persistent elements including the first one and M-1 additional ones; and randomly determining whether or not to award the game features associated with the M cascaded persistent elements; and in response to awarding the associated game features, implementing, by the game-logic circuitry, the awarded associated game features in either the base game or a bonus game.

2. The method of claim 1, further comprising:

if the awarded game features include both the bonus game and one or more modifying game features distinct from the bonus game itself, presenting, by the presentation assembly, the bonus game modified by each of the one or more modifying game features, and if the awarded game features do not include a bonus game, presenting, by the presentation assembly, the base game modified by each of the awarded associated game features.

3. The method of claim 1, wherein the gaming machine is regulatorily approved and primarily dedicated to playing a wagering game.

4. The method of claim 1, wherein at least one of the game features comprises a variable attribute persisting across a plurality of game cycles.

5. The method of claim 4, wherein the variable attribute comprises a number of free spins.

6. The method of claim 4, wherein the variable attribute comprises a credit multiplier.

7. The method of claim 1, wherein at least one of the awarded game features comprises a plurality of symbol-bearing supplemental reels and a supplemental array, the supplemental array modified by each awarded associated game feature that does not comprise a plurality of symbol-bearing supplemental reels and a supplemental array.

8. The method of claim 1, wherein randomly determining whether or not to award the game features associated with the subsequent number of persistent elements is, at least in part, based on the value of M.

9. The method of claim 1, wherein the animating operation includes increasing a size of the persistent element or a volume of items therein.

10. The method of claim 1, wherein the plurality of symbol-bearing base reels comprises at least one electromechanical reel.

11. A gaming machine comprising:

a gaming cabinet;

a presentation assembly; and game-logic circuitry secured within a locked box inside the gaming cabinet, the ga logic circuitry including memory storing programming for a random number generator (RNG) that cycles continuously in the background between games and during game play at a speed that cannot be timed by the player and a wagering game, the game-logic circuitry configured to, prior to executing the wagering game, execute an authentication program on the gaming machine to authenticate the programming, and the game-logic circuitry further configured while operating in an authenticated state to perform the operations of:

conducting a base game including: presenting, by the presentation assembly, a plurality of symbol-bearing base reels, a base array, and a plurality of N persistent elements, each persistent element having an associated game feature;

spinning and stopping the plurality of symbol-bearing base reels to land symbols from the symbol-bearing base reels in the base array; and in response to the landed symbols including at least one accumulation symbol and while operating in the authenticated state:

determining a randomly determined cascade level M from 1 to N using an output generated by the RNG;

based on the determined cascade level M, causing the presentation assembly to animate an addition of the at least one accumulation symbol to a first one of the N plurality of persistent elements and to further animate transference of the at least one accumulation symbol from the first one of the N plurality of persistent elements to a subsequent number of persistent elements equal to M minus one, thereby defining a set of M cascaded persistent elements including the first one and M-1 additional ones; and randomly determining whether or not to award the game features associated with the M cascaded persistent elements; and in response to award the associated me features, implementing the one or more me features in either the base game or a bonus game.

12. The gaming machine of claim 11, wherein:

if the awarded game features include both the bonus game and one or more modifying game features distinct from the bonus game itself, presenting, by the presentation assembly, the bonus game modified by each of the one or more modifying game features, and if the awarded game features do not include a bonus game, presenting, by the presentation assembly, the base game modified by each of the awarded associated game features.

13. The gaming machine of claim 11, wherein the gaming machine is regulatorily approved and primarily dedicated to playing a wagering game.

14. The gaming machine of claim 11, wherein the plurality of symbol-bearing base reels comprise at least one electromechanical reel.

15. The gaming machine of claim 11, wherein at least one of the game features comprises a variable attribute persisting across a plurality of game cycles.

16. The gaming machine of claim 15, wherein the variable attribute comprises a number of free spins.

17. The gaming machine of claim 15 wherein the variable attribute comprises a credit multiplier.

18. The gaming machine of claim 11, wherein at least one of the awarded game features comprises a plurality of symbol-bearing supplemental reels and a supplemental array, the supplemental array modified by each awarded associated game feature that does not comprise a plurality of symbol-bearing supplemental reels and a supplemental array.

19. The gaming machine of claim 11, wherein randomly determining whether or not to award the game features associated with the subsequent number of persistent elements is, at least in part, based on the value of M.

20. The gaming machine of claim 11, wherein the animating operation includes increasing a size of the persistent element or a volume of items therein.

* * * * *